US012695831B2

(12) United States Patent
Chen et al.

(10) Patent No.: US 12,695,831 B2
(45) Date of Patent: Jul. 28, 2026

(54) MONITORING AND MAINTAINING SIGNAL QUALITY FOR EACH PARTICIPANT OF A GROUP CALL

(71) Applicant: International Business Machines Corporation, Armonk, NY (US)

(72) Inventors: Dong Chen, Beijing (CN); Ting Ting Zhan, Beijing (CN); Ming Lei Zhang, Beijing (CN); Yuan Jie Zhang, Ningbo (CN); Yin Xi Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 18/403,584

(22) Filed: Jan. 3, 2024

(65) Prior Publication Data

US 2025/0220118 A1 Jul. 3, 2025

(51) Int. Cl.
*H04M 3/56* (2006.01)

(52) U.S. Cl.
CPC .................................. *H04M 3/569* (2013.01)

(58) Field of Classification Search
None
See application file for complete search history.

(56) References Cited

U.S. PATENT DOCUMENTS

| | | | |
|---|---|---|---|
| 8,713,440 B2 | 4/2014 | Bhattacharjee et al. | |
| 10,681,311 B1 | 6/2020 | Gottman et al. | |
| 11,558,438 B1 | 1/2023 | Lu et al. | |
| 2016/0234268 A1* | 8/2016 | Ouyang .................. | H04L 67/54 |
| 2018/0241882 A1* | 8/2018 | Lee .......................... | H04N 7/147 |
| 2019/0068389 A1 | 2/2019 | Chitre et al. | |
| 2022/0385758 A1* | 12/2022 | Tadesse .................. | G10L 25/51 |
| 2023/0022533 A1 | 1/2023 | Lu et al. | |

FOREIGN PATENT DOCUMENTS

CN           113824726 B        9/2023

* cited by examiner

*Primary Examiner* — Antim G Shah
(74) *Attorney, Agent, or Firm* — Stephen R. Yoder

(57) ABSTRACT
A computer-implemented method, according to one approach, includes: receiving a source audio signal from a speaker on a group call between the speaker and participants. Copies of resulting audio signals are also received from the participants. The copies of the resulting audio signals include unique versions of the source audio signal as it was received by the respective participants. The computer-implemented method also includes determining an amount of the source audio signal that is received by the respective participants. The determination is made by comparing the source audio signal with the respective copies of the resulting audio signals. Statuses that are correlated with the amount of the source audio signal received by the respective participants are further output to the speaker.

18 Claims, 4 Drawing Sheets

100

316

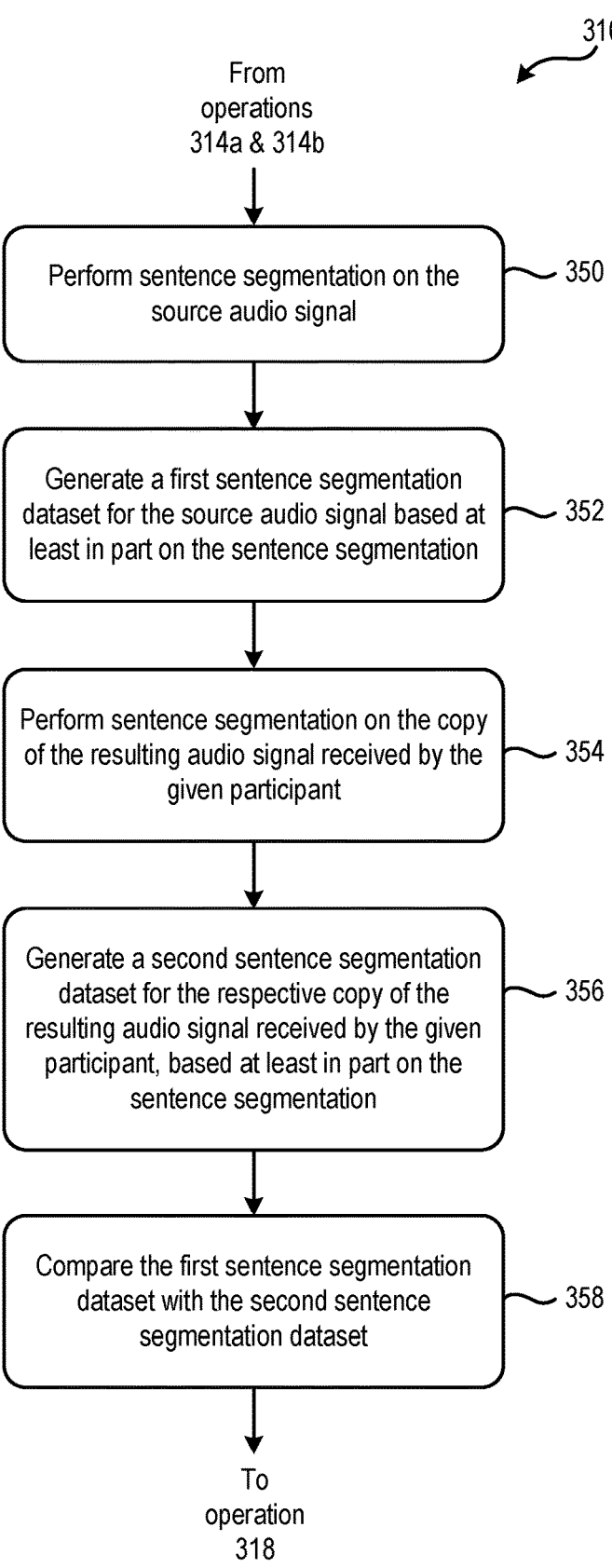

From
operations
314a & 314b

Perform sentence segmentation on the
source audio signal                              350

Generate a first sentence segmentation
dataset for the source audio signal based at     352
least in part on the sentence segmentation Perform sentence segmentation on the copy
of the resulting audio signal received by the    354
given participant Generate a second sentence segmentation
dataset for the respective copy of the
resulting audio signal received by the given     356
participant, based at least in part on the
sentence segmentation Compare the first sentence segmentation
dataset with the second sentence                 358
segmentation dataset To
operation
318

FIG. 3B

MONITORING AND MAINTAINING SIGNAL QUALITY FOR EACH PARTICIPANT OF A GROUP CALL

BACKGROUND

The present invention relates to distributed communication systems, and more specifically, this invention relates to monitoring and maintaining signal quality for each participant of a group call.

Group calls include various types of online audio and/or video collaborative services, including webinars, video calls, teleconferences using voice over Internet protocol, etc. Applications for group calls further include meetings, training events, lectures, presentations shared between web-connected computers, etc. In general, group calls are made possible by Internet technologies which allow for communication to exist between different locations. Group calls thereby offer data streams of text-based messages, audio signals, video and/or still images, etc., to be shared simultaneously, across geographically dispersed locations.

Group calls have become a frequently used tool to facilitate virtual work meetings and other group environments, like online teaching. While it is beneficial for information to be exchanged between each location in a virtual meeting to emulate an in-person meeting, network capabilities and other factors impact the amount of information that can be shared between locations on a same group call. For instance, periods of low network bandwidth may limit audio and/or video quality experienced by participants of a group call. The limited bandwidth may cause portions of the audio and/or video signals to be lost in transit, resulting in the group call participants missing portions of the experience despite being in attendance.

SUMMARY

A computer-implemented method, according to one approach, includes: receiving a source audio signal from a speaker on a group call between the speaker and participants. Copies of resulting audio signals are also received from the participants. The copies of the resulting audio signals include unique versions of the source audio signal as it was received by the respective participants. The computer-implemented method also includes determining an amount of the source audio signal that is received by the respective participants. The determination is made by comparing the source audio signal with the respective copies of the resulting audio signals. Statuses that are correlated with the amount of the source audio signal received by the respective participants are further output to the speaker.

A computer program product, according to another approach, includes: a set of one or more computer-readable storage media, as well as program instructions. The program instructions are collectively stored in the set of one or more storage media, for causing a processor set to perform the foregoing computer-implemented method.

A computer system, according to yet another approach, includes: a processor set, and a set of one or more computer-readable storage media. The computer system also includes program instructions that are collectively stored in the set of one or more storage media. Moreover, the program instructions are for causing the processor set to perform the foregoing computer-implemented method.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 3B is a flowchart of sub-processes for one of the operations in the method of FIG. 3A, in accordance with one approach.

DETAILED DESCRIPTION

Figure 1:
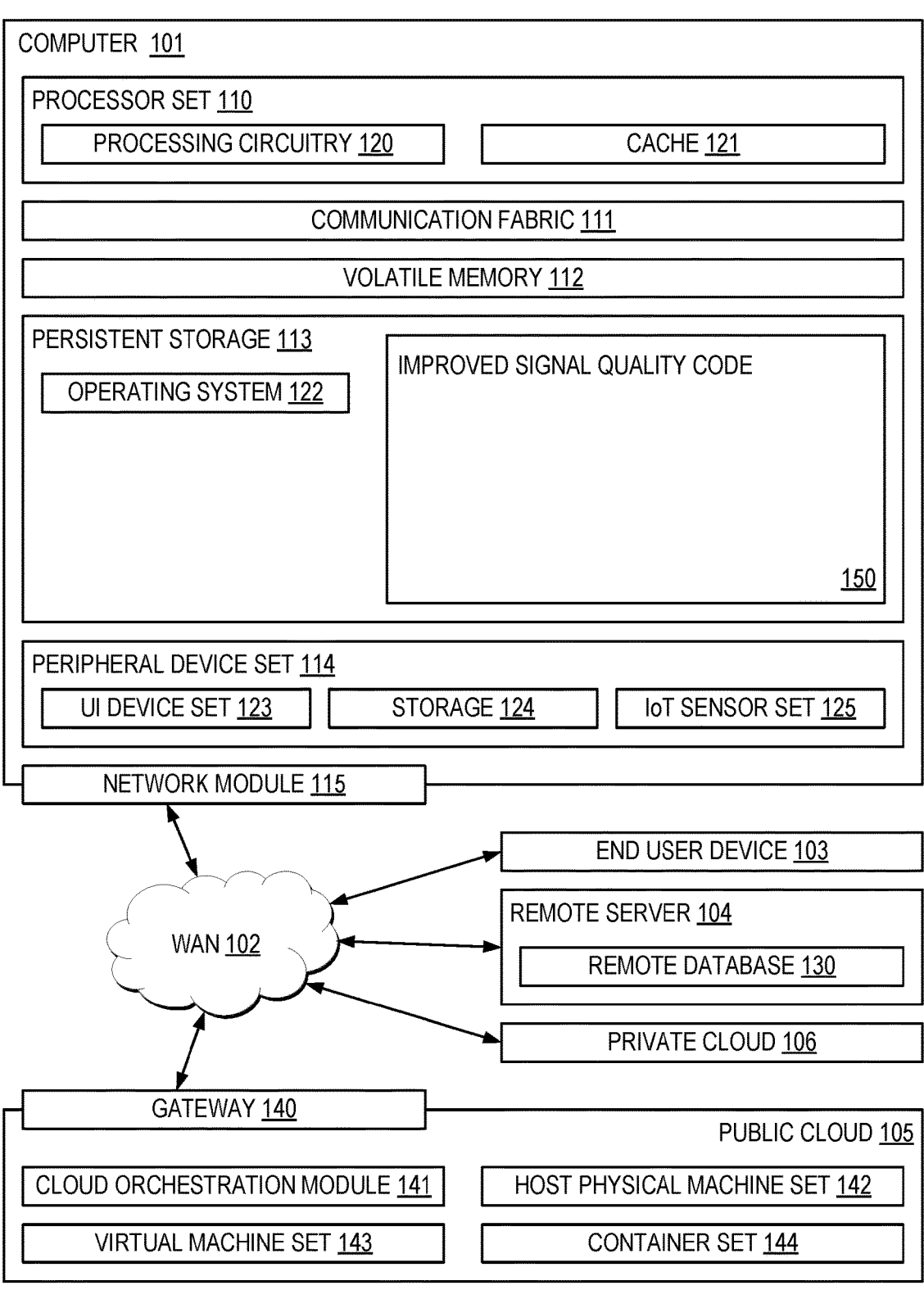
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for monitoring and maintaining a desirable signal quality for each participant of a group call. Approaches herein include comparing the information received by each participant of a group call with the information that was originally sent to the participants. This identifies situations where information sent to participants of a group call is lost in transit, providing an opportunity for the lost information to be automatically resupplied, e.g., as will be described in further detail below.

In one general approach, a computer-implemented method includes: receiving a source audio signal from a speaker on a group call between the speaker and participants. Copies of resulting audio signals are also received from the participants. The copies of the resulting audio signals include unique versions of the source audio signal as it was received by the respective participants. The computer-implemented method also includes determining an amount of the source audio signal that is received by the respective participants. The determination is made by comparing the source audio signal with the respective copies of the resulting audio signals. Statuses that are correlated with the amount of the source audio signal received by the respective participants are further output to the speaker.

In another general approach, a computer program product includes: a set of one or more computer-readable storage media, as well as program instructions. The program instructions are collectively stored in the set of one or more storage media, for causing a processor set to perform the foregoing computer-implemented method.

In yet another general approach, a computer system includes: a processor set, and a set of one or more computer-readable storage media. The computer system also includes program instructions that are collectively stored in the set of one or more storage media. Moreover, the program instructions are for causing the processor set to perform the foregoing computer-implemented method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved signal quality code at block 150 for monitoring and maintaining a desirable signal quality for each participant of a group call. This process may serve as a preliminary step of establishing a trusted communication channel between the microservices, e.g., that may implement encryption and/or authentication.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine (VM) set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of VMs from VM set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are VMs and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, group calls include various types of online audio and/or video collaborative services, including webinars, video calls, teleconferences using voice over Internet protocol, etc. Applications for group calls further include meetings, training events, lectures, presentations shared between web-connected computers, etc. In general, group calls are made possible by Internet technologies which allow for communication to exist between different locations. Group calls thereby offer data streams of text-based messages, audio signals, video and/or still images, etc., to be shared simultaneously, across geographically dispersed locations.

Group calls have become a frequently used tool to facilitate virtual work meetings and other group environments, like online teaching. While it is beneficial for information to be exchanged between each location in a virtual meeting to emulate an in-person meeting, network capabilities and other factors may impact the amount of information that can be shared between locations on a same group call. For instance, periods of low network bandwidth may cause audio and/or video issues to be experienced by participants of a group call. The limited bandwidth may cause portions of the audio and/or video signals to be lost in transit, resulting in the group call participants missing portions of the experience altogether, despite being in attendance.

Conventional products have been unable to overcome this shortcoming, causing participants to attempt recreating the missed portions of a group call after the fact. For example, two participants of a conventional video call would resort to calling each other on a separate phone connection to convey some missed portion of the group video call without disrupting the remaining participants. This is a time consuming process that offers restricted information exchange, while directing the attention of participants away from the ongoing group call and reducing the experience of all participants involved. Accordingly, there exists a need for ways of efficiently conveying missed content from a group setting while protecting privacy of participants and without negatively affecting the experience of the other participants.

In sharp contrast to these conventional shortcomings, implementations herein are desirably able to improve the experience of participants on a group call by monitoring the signal quality received by each of the participants. This is achieved at least in part by comparing the information (e.g., signals) that were originally sent to participants of a group call, with the information (e.g., signals) that were actually received by the participants. Differences between these signals can be used to determine the relative experience each of the participants has during the group call. These identified differences may also be used to supplement the information received by certain participants in real-time, thereby improving the exchange of information during the group call as well as the overall experience, e.g., as will be described in further detail below.

It should also be noted that the term "group call" as used herein is intended to refer to any desired type of group communication that involves audio, video, data, etc. signals being exchanged between participants of the group call. It should also be noted that while various approaches herein are described in the context of evaluating audio signals, this is in no way intended to be limiting. Rather, approaches herein may be applied to the information received in different types of signals during a group call, e.g., such as video signals, data streams, sensor outputs, etc., as would be appreciated by one skilled in the art after reading the present description. With respect to the present description, an "audio signal" as used herein is intended to refer to any type of sound representation that can be stored in any desired format. For instance, an audio signal may actually be an audio file which includes a series of binary numbers that are a digital representation of the sounds in the audio signal. The binary numbers may further be compressed in some instances to reduce the resulting size of the audio file. In other approaches, an audio file may be represented as an analog signal using changing level of electrical voltages.

Figure 2:
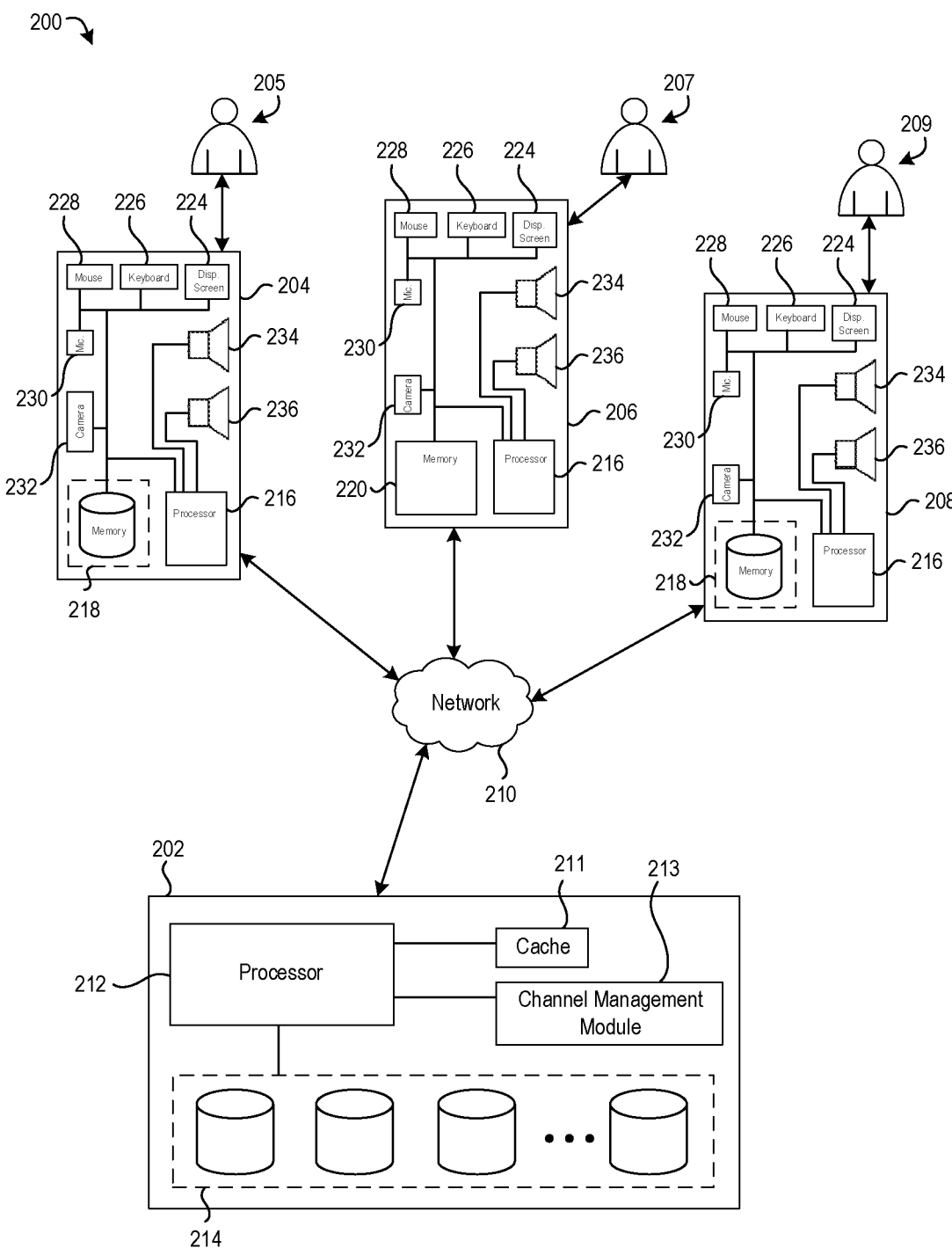
FIG. 2 is a representational view of a distributed system, in accordance with one approach.

Looking now to FIG. 2, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the system 200 includes a central server 202 that is connected to electronic devices 204, 206, 208 accessible to the respective users 205, 207, 209. Each of these electronic devices 204, 206, 208 and respective users 205, 207, 209 may be separated from each other such that they are positioned in different geographical locations. For instance, the central server 202 and electronic devices 204, 206, 208 are connected to a network 210.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. While the electronic devices 204, 206, 208 and central server 202 are shown as being connected to network 210, two or more of the electronic devices may be connected differently depending on the approach. According to an example, which is in no way intended to limit the invention, two desktop computers may be located in the same office building and connected by a same wired network. In another example, which again is in no way intended to be limiting, edge compute nodes may be located relatively close to each other and connected by a wired connection, e.g., a cable, a fiber-optic link, a wire, etc.; etc., or any other type of connection which would be apparent to one skilled in the art after reading the present description.

It follows that in some approaches, the users 205, 207, 209 may communicate with each other on a group call that allows for information to be exchanged therebetween. As a result, any desired signals, data, commands, instructions, responses, requests, etc. may be sent between users 205, 207, 209 using the electronic devices 204, 206, 208 and/or central server 202, regardless of the amount of separation which exists therebetween, e.g., despite being positioned at different geographical locations. Thus, while each of the electronic devices 204, 206, 208 and central server 202 are shown as being connected to a same network 210, information may be sent between the locations differently depending on the implementation. According to an example, which is in no way intended to limit the invention, a shared (e.g., open) communication channel corresponding to a group video chat may be formed between each of the electronic devices 204, 206, 208. This shared communication channel may be formed by the processor 212 and channel management module 213 in response to a scheduled meeting, receiving an impromptu request from a user, a predetermined condition being met, etc. The shared communication channel thereby allows the users 205, 207, 209 to exchange information (e.g., audio signals, video images, typed messages, etc.) freely between each other.

As previously mentioned, group calls are not always successful in relaying information to each participant. For instance, periods of low network bandwidth may cause audio and/or video issues to be experienced by participants of a group call. The limited bandwidth may cause portions of the audio and/or video signals to be lost in transit, resulting in the group call participants missing portions of the experience altogether, despite being in attendance.

While conventional products have been unable to overcome these issues, much less in an efficient manner, approaches herein are able to ensure each participant of a group call has a desirable experience. This is achieved at least in part by identifying situations where group call participants miss portions of the group call (e.g., due to network limitations), and providing supplemental access to the missed content, e.g., as will be described in further detail below in FIG. 3A.

With continued reference to FIG. 2, the electronic devices 204, 206, 208 are shown as having a different configuration than the central server 202. For example, in some implementations the central server 202 includes a large (e.g., robust) processor 212 coupled to a cache 211, a channel management module 213, and a data storage array 214 having a relatively high storage capacity. The central server 202 is thereby able to process and store a relatively large amount of data, as well as manage various communication paths (e.g., group calls) that extend between different users. This allows the central server 202 to connect to, and manage, the exchange of information between multiple different remote user locations over group calls. For instance, this may be achieved at least in part by controlling which users are included on each group call.

The central server 202 may also store at least some information about the different electronic devices 204, 206, 208 and/or users 205, 207, 209. For instance, user defined authentication information (e.g., passwords), activity-based information (e.g., geographic location), application preferences, performance metrics, etc., may be collected from the users 205, 207, 209 over time and stored in memory for future use. Additionally, at least some of the information that is collected from the users may be hashed and randomized before being stored in memory in some approaches. For instance, some approaches include encrypting and storing preferential selections, geographical location information, passwords, etc. This information can later be used to determine whether a given user is permitted to join a group call. For example, security standards may be predefined for a group call and compared against information associated with each user attempting to join the group call. Users with information that satisfies the security standards may thereby be allowed to join the group call, while users with information that does not satisfy the security standards are denied.

Looking now to the electronic devices 204, 206, 208, each are shown as including a processor 216 coupled to memory 218, 220. The memory implemented at each of the electronic devices 204, 206, 208 may be used to store data received from one or more sensors (not shown) in communication with the respective electronic devices, the users 205, 207, 209 themselves, the central server 202, different systems also connected to network 210, etc. It follows that different types of memory may be used. According to an example, which is in no way intended to limit the invention, electronic devices 204 and 208 may include hard disk drives as memory 218 while electronic device 206 includes a solid state memory module as memory 220.

The processor 216 is also connected to a display screen 224, a keyboard 226, a computer mouse 228, a microphone 230, and a camera 232. The processor 216 may thereby be configured to receive inputs from the keyboard 226 and computer mouse 228 as entered by the users 205, 207, 209. These inputs typically correspond to information presented on the display screen 224 while the entries were received. Moreover, the inputs received from the keyboard 226 and computer mouse 228 may impact the information shown on display screen 224, data stored in memory 218, 220, information collected from the microphone 230 and/or camera 232, status of an operating system being implemented by processor 216, etc. Each of the electronic devices 204, 206, 208 are also shown as including a first speaker 234 and a second speaker 236. The speakers 234, 236 correspond to a different audio channel extending from processor 216. Accordingly, each of the speakers 234, 236 may be used to perform the same or different audio signals compared to each other.

It should also be noted that the display screen 224, the keyboard 226, the computer mouse 228, microphone 230, camera 232, and speakers 234, 236 are each coupled directly to the processor 216 in the present implementation. Accordingly, inputs received from the keyboard 226 and/or computer mouse 228 may be evaluated before being implemented in the operating system and/or shown on display screen 224. For example, processors 216 in the electronic devices 204, 206, 208 may perform any one or more of the operations described below in method 300 of FIG. 3 in order to improve the exchange of information between participants on a group call.

While the electronic devices 204, 206, 208 are depicted as including similar components and/or design, it should again be noted that each of these electronic devices 204, 206, 208 may include any desired components which may be implemented in any desired configuration. In some instances, each user device (e.g., mobile phone, laptop computer, desktop computer, etc.) connected to a network may be configured differently to provide each location with a different functionality. According to an example, which is in no way intended to limit the invention, electronic devices 204 may include a cryptographic module (not shown) that allows the user 205 to produce encrypted data, while electronic devices 206 includes a data compression module (not shown) that allows for data to be compressed before being sent over the network 210 and/or stored in memory, thereby improving performance of the system by reducing network strain and/or compute overhead at the electronic device itself.

Figure 3A:
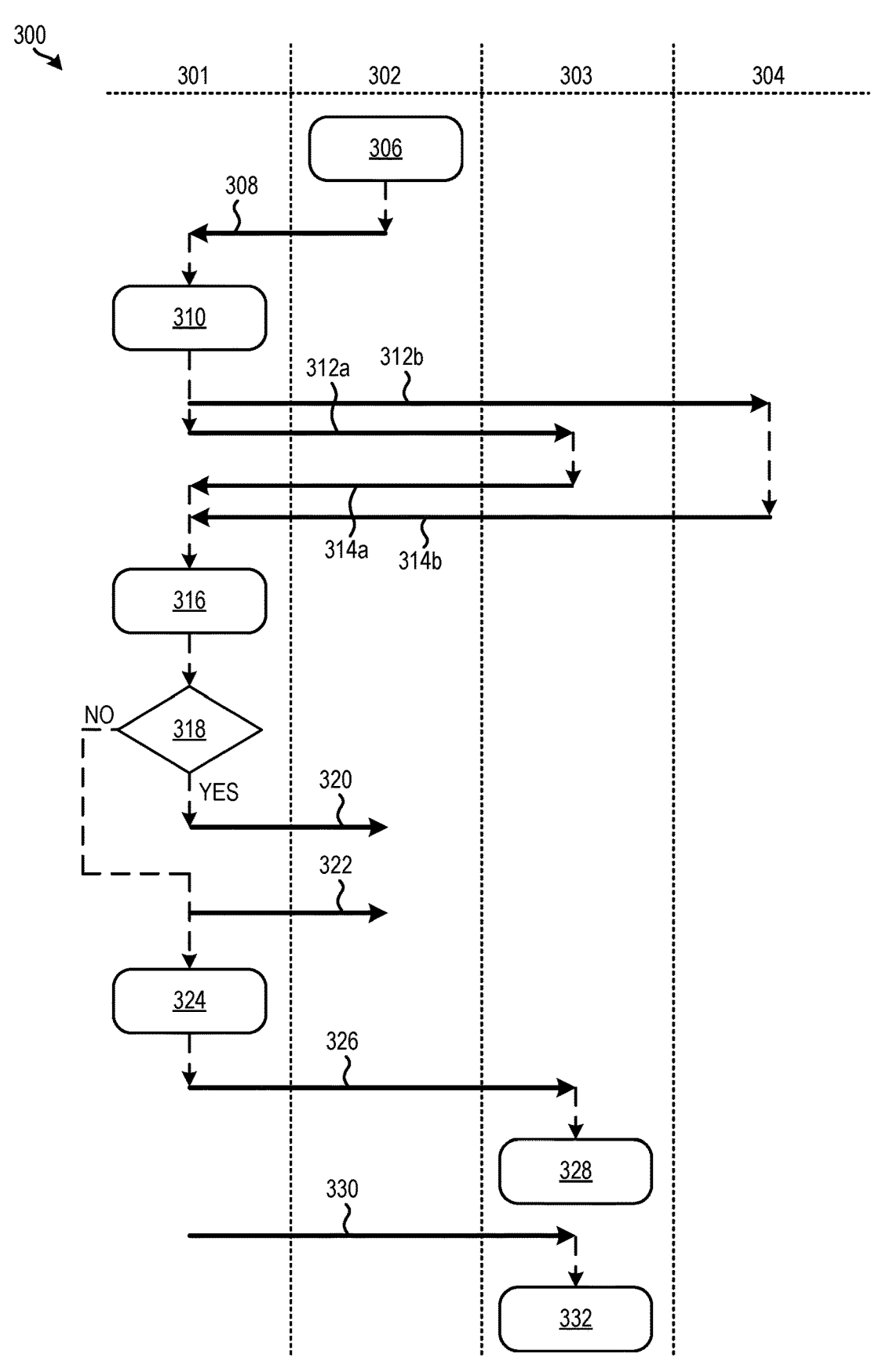
FIG. 3A is a flowchart of a method, in accordance with one approach.

Looking now to FIG. 3A, a flowchart of a computer-implemented method 300 for monitoring and maintaining a desirable signal quality for each participant of a group call is illustrated in accordance with one approach. In other words, method 300 involves comparing the information received by each participant of a group call with the information originally sent to the participants. This identifies situations where information sent to participants of a group call is lost in transit, providing an opportunity for the lost information to be automatically resupplied.

The method 300 may be performed in accordance with any of the environments depicted in FIGS. 1-2, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment. Each of the nodes 301, 302, 303, 304 shown in the flowchart of method 300 may correspond to one or more processors, controllers, computers, etc., positioned at a different location of a distributed system. For instance, node 301 may include one or more processors at a central node of a distributed system (e.g., see processor 212 of FIG. 2). Moreover, node 302 may include one or more processors of a user device (e.g., electronic device 204 of FIG. 2), while node 303 includes one or more processors of a different user device (e.g., electronic device 206 of FIG. 2), and node 304 includes one or more processors of yet another user device (e.g., electronic device 208 of FIG. 2). It follows that signals, commands, data, requests, etc. may be sent between each of the nodes 301, 302, 303, 304 across a communication channel extending therebetween. In other words, user devices at nodes 302, 303, 304 may be considered participants of a same group call, while processors at node 301 monitor information being sent between the participants of the group call.

It should be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches. Moreover, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Looking specifically now to the flowchart, operation 306 is performed at node 302. There, operation 306 includes producing a source audio signal. In other words, one of the group call participants at node 302 generates an audio signal by speaking into a physical microphone, playing a prerecorded audio file, submitting an audio sample to the group call, etc. Again, because nodes 302, 303, 304 are each considered participants of a same group call, they can communicate with each other by generating audio signals that are transmitted to the remaining participants on the group call. It follows that in the present approach, node 302 represents a "speaker" by generating the source audio signal that is to be transmitted to the remaining participants on the group call. According to an example, a user at node 302 may be giving a presentation to the remaining participants on a group call. Thus, while node 302 serves as a "speaker" in the present approach, this is in no way intended to be limiting. In other approaches, node 303 and/or 304 may generate audio signals that are sent to each of the remaining participants on the group call, e.g., as would be appreciated by one skilled in the art after reading the present description. It should also be noted that video signals (e.g., streams), text, sensor data, etc., may be produced by a "speaker" and sent to other participants of a group call. Thus, approaches herein that refer to audio signals are in no way intended to be limiting.

Although the audio signal generated at node 302 are intended for the remaining nodes 303, 304 on the same group call with node 302, the source audio signal is first sent to node 301. See operation 308. As noted above, node 301 may include one or more processors at a central node of a distributed system (e.g., see processor 212 of FIG. 2). Moreover, the source audio signal may be received with supplemental metadata, e.g., such as intended recipients of the source audio signal. Accordingly, node 301 may be able to evaluate the received source audio signal, determine the intended recipients of the source audio signal, and direct copies of the source audio signal to the intended recipients. It follows that processors at node 301 effectively monitor the information that is being sent between the participants of a group call.

In response to receiving the source audio signal at node 301, as well as any supplemental information (e.g., metadata corresponding to details of the source audio signal, identifying information associated with the speaker that generated the source audio signal, intended recipients of the source audio signal, etc.), the flowchart proceeds to operation 310. There, operation 310 includes storing a copy of the source audio signal in memory. This allows the central location to maintain an original copy of the source audio signal as it was initially generated by the speaker and received at node 301. This original copy may thereby be compared against the audio signals that are received by each of the participants on the group call to determine the audio quality experienced by each of the participants, e.g., as will be described in further detail below.

In addition to storing a copy of the source audio signal in memory, node 301 creates a copy of the source audio signal for each of the group call participants. It follows that operation 310 may further include generating copies of the source audio signal for the participants. Proceeding to operations 312a and 312b, a copy of the source audio signal is sent to each participant on the group call. More specifically, operation 312a shows one copy of the source audio signal being sent to node 303, while operation 312b includes another copy of the source audio file being sent to node 304. In some approaches, the source audio signal includes metadata that identifies the group call participants copies of the source audio signal should be sent to. Thus, node 301 may evaluate the source audio signal as well as any available supplemental information to determine where copies of the source audio signal should be sent. In other approaches, node 301 may reference a lookup table that lists each of the participants on a group call.

The process of sending the source audio signal to the remote group call participants may involve digitally encoding the voice signal before compressing the voice signal and packaging it for transmission. Additionally, in response to receiving an audio signal (e.g., see operations 314a, 314b below), the audio signal may be unpacked and converted into an analog voice output, e.g., as would be appreciated by one skilled in the art after reading the present description.

As previously mentioned, while the copies that are sent to nodes 303 and 304 are accurate representations of the source audio signal, the information that is ultimately received at nodes 303 and 304 may differ. Again, factors including network bandwidth and connectivity strength impact how information is transmitted from one location to another. The copies of the source audio signal that are received at nodes 303 and 304 may thereby not be an accurate representation of the actual source audio signal. For instance, periods of low network bandwidth may cause audio and/or video issues to be experienced by participants of a group call. The limited bandwidth may cause portions of the audio and/or video signals to be lost in transit, resulting in the group call participants missing portions of the experience altogether, despite being in attendance. In other words, nodes 303 and 304 may receive only a portion of the complete source audio signal.

While conventional products have been unable to overcome this shortcoming, implementations herein are desirably able to improve the experience of participants on a group call by monitoring the signal quality received by each of the participants. This is achieved at least in part by comparing the information (e.g., signals) that was originally sent to participants of a group call, with the information (e.g., signals) that was actually received by the participants. Differences between these unique (or different) versions of information can be used to determine the relative experience had by each of the participants during the group call. These identified differences may also be used to supplement the information received by certain participants in real-time, thereby improving the exchange of information during the group call as well as the overall experience.

Accordingly, operation 314a includes returning a copy of the resulting audio signal as it was received at node 303, while operation 314b includes returning a copy of the resulting audio signal as it was received at node 304. In other words, a summary of the information still included in the source audio file as it was received at node 303 as a result of performing operation 312a, is returned to node 301 in operation 314a. Similarly, a summary of the information still included in the source audio file as it was received at node 304 as a result of performing operation 312b, is returned to node 301 in operation 314b. Again, the source audio signal may be intentionally and/or unintentionally modified in transit as a result of network bandwidth, communication channel type, predetermined policies, memory constraints, etc. It should thereby be noted that with respect to the present description, a "resulting audio signal" refers to the audio signal that is actually received by a group call participant from the speaker, which may differ from the source audio signal originally generated by the speaker and sent to each of the participants.

Looking to node 301, copies of the resulting audio signals are received from participants at node 303 and 304. Again, each copy of a resulting audio signal includes (e.g., represents) a unique version of the source audio signal as it was received by a respective participant. Operation 316 thereby includes determining an amount of the source audio signal that is received by each of the respective participants. For example, operation 316 may include determining a number of differences between the source audio signal and the copies of the resulting audio signals actually received by the group call participants.

In preferred approaches, this determination of the amount of signal received is made at least in part by comparing the source audio signal with the received resulting audio signals, or equivalently, comparing some metric characterizing the source audio signal to similar metrics characterizing the resulting audio signals. In some implementations, a digital representation of the source audio signal may be compared against digital representations of the resulting audio signals. The digital representations of the audio signals themselves may thereby be compared against each other. In other implementations, digital audio signals may be converted into analog audio signals and compared against each other. Thus, the analog representations of the audio signals themselves may be compared against each other. In yet other approaches, an actual or approximate number of bytes of data of the source audio signal may be compared to the actual or approximate number of bytes of data received at the recipient locations. In yet further approaches, the number of packets of data sent from the speaker's computer with the source audio encoded therein may be compared to the number of packets of data received by the computers of the other participants. In yet further approaches, the temporal length of the outgoing source audio signal may be compared to the temporal lengths of the audio signal received by the other participants, e.g., in terms of seconds, minutes, etc. of audio received or audio lost.

In still other implementations, contextual analysis may be performed on the audio signals to determine whether a sufficient portion of the original message has been delivered to the participants of the group call. For instance, looking now to FIG. 3B, exemplary sub-operations of determining the amount of the original source audio signal actually received by a given participant are illustrated in accordance with one approach. Accordingly, one or more of the sub-operations in FIG. 3B may be repeated in an iterative fashion for each participant on a group call in order to perform operation 316 of FIG. 3A in some approaches. However, it should be noted that the sub-operations of FIG. 3B are illustrated in accordance with one approach which is in no way intended to be limiting.

As shown, sub-operation 350 includes performing sentence segmentation on the source audio signal. In other words, sub-operation 350 includes using speech recognition to identify statements made by the speaker in the source audio signal, and segmenting those statements into discrete sentences. In some approaches, the sentence segmentation may be performed at least in part by one or more machine learning models that have been trained to perform natural language processing. The machine learning models may thereby be able to perform a semantic evaluation of the source audio signal and identify discrete sentences therein. In other approaches, the source audio signal may be converted into a textual representation of the words that are spoken, before being evaluated by the machine learning models to identify the discrete sentences. It should also be noted that although approaches herein describe separating audio signals into discrete sentences for evaluation, this is in no way intended to be limiting. In other approaches, an audio signal may be divided into segments that correspond to individual words, topics of discussion, slides of a presentation, audible inflections and/or tones of the speaker, predetermined conditions being met, etc.

Moreover, sub-operation 352 includes generating a first sentence segmentation dataset for the source audio signal based at least in part on the sentence segmentation. In other words, the sentence segmentation performed in sub-operation 350 is used to identify the starting point and ending point of each discrete sentence in the source audio signal. The start and end points of a sentence may be referenced using timestamps that correspond to the source audio signal. Additionally, each sentence may be denoted by an address that corresponds to a location in the source audio signal. The information generated as a result of performing sub-operations 350, 352 may be organized (e.g., in a lookup table) and stored in memory. It follows that the first sentence segmentation dataset provides a converted and more detailed representation of the source audio signal. It is beneficial to separate statements made in the source audio signal into different sentences to gain an accurate understanding of the different ideas that are being conveyed by the speaker to the remaining participants on the group call. It also makes it easier to identify specific portions of the source audio signal that may not have been received by a participant of the group call, e.g., as will be described in further detail below. However, it should be noted that the statements identified from the source audio signal may be partitioned based on different criteria, e.g., such as the type of statement made (e.g., question, demand, factual statement, etc.), the subject of a statement made by the speaker, predetermined keywords, preestablished security protocols, etc. in other approaches.

From sub-operation 352, the flowchart proceeds to operation 354. There, sub-operation 354 includes performing sentence segmentation on the copy of the resulting audio signal received by the given participant. In other words, sub-operation 354 includes using speech recognition to identify statements that are still present in the respective copy of the resulting audio signal received by the given participant of the group call, and segmenting those statements into discrete sentences. Moreover, sub-operation 356 includes generating a second sentence segmentation dataset for the respective copy of the resulting audio signal received by the given participant, based at least in part on the sentence segmentation. The second sentence segmentation dataset may thereby provide a representation of the resulting audio signal as it was received by the given group call participant. It is beneficial to identify statements that are in a received resulting audio signal to gain an accurate understanding of the ideas that are successfully conveyed from a speaker to a participant on the group call. However, the statements identified from the source audio signal may be partitioned based on other criteria, e.g., as mentioned above. It should also be noted that sub-operations 354, 356 may be performed using any of the approaches described above with respect to sub-operations 350, 352.

From sub-operation 356, the flowchart proceeds to sub-operation 358. There, sub-operation 358 includes comparing the first sentence segmentation dataset with the second sentence segmentation dataset. In other words, the first and second sentence segmentation datasets are compared in order to determine if the given group call participant received a complete copy of the source audio signal. This may be performed by comparing the addresses, starting points, and/or ending points of each sentence identified in the source audio signal and the resulting audio signal. According to an example, each row and/or column of the first sentence segmentation dataset is compared against a corresponding row and/or column of the second sentence segmentation dataset to determine whether any portions of the source audio signal were not successfully delivered to the respective group call participant. As noted above, limited network bandwidth and other factors may cause portions of the original source audio signal to become lost in transit to a group call participant. By identifying these portions of the source audio signal that are not delivered to the intended recipient, supplemental information may be provided to the intended recipient to rectify the situation, e.g., as will be described in further detail below.

Returning now to FIG. 3A, method 300 advances from operation 316 to operation 318. There, operation 318 includes determining whether a sufficient amount of the source audio signal was received by each of the group call participants. In other words, operation 318 includes determining whether each of the group call participants were able to experience a desired amount of the group call. It follows that operation 318 and/or operation 316 may be repeated for each of the participants that are currently on a group call. Operations 318 and/or 316 may further be repeated each time a source audio signal is produced by the speaker of the group call and sent to the remaining participants. This allows for method 300 to dynamically review the audio signals that are produced by a speaker and determine whether they are accurately conveyed to participants of the group call in real-time, e.g., as would be appreciated by one skilled in the art after reading the present description.

In some approaches, operation 318 may simply determine whether a copy of the source audio signal was even received by each of the group call participants. This may be determined based at least in part on whether a copy of a resulting audio signal is received from each participant on the group call (e.g., see operations 314a, 314b). In such approaches, it may be determined that a given participant has an undesirable (e.g., negative) status in response to determining a copy of a resulting audio signal was not received from the given participant.

However, in response to determining a copy of a resulting audio signal was received from the given participant, the source audio signal may further be compared with the respective copy of the resulting audio signal. In other words, in some approaches operation 318 includes determining whether the number of differences between a source audio signal generated by a speaker on a group call, and a copy of the source audio signal as received by a participant of the group call, is in a predetermined range. The predetermined range may be set by a user, dynamically adjusted based on real-time performance, based on industry standards, etc. In some approaches the sentence segmentation datasets for the audio signals may be compared to determine how many differences exist between the audio signals themselves. However, operation 318 may evaluate different factors to determine whether a sufficient amount of the source audio signal was received. It should also be noted that "in a predetermined range" is in no way intended to be limiting. Rather than determining whether a number of differences between two audio signals is in a predetermined range, equivalent determinations may be made, e.g., as to whether a value is above a threshold, whether a value is outside a predetermined range, whether an absolute value is above a threshold, whether a value is below a threshold, etc., depending on the desired approach.

The determinations that are made at operation 318 are preferably output (e.g., displayed) to the "speaker" of the group call in real-time. Thus, the determinations made at operation 318 for each of the group call participants may be dynamically combined as they are received. In other words, outputs of operation 318 correlated with the amount of the source audio signal received by the respective participants, may be summarized, e.g., in a lookup table. According to an example, which is in no way intended to be limiting, the statuses are summarized in real-time on a user interface shown on a display screen that is accessible (e.g., visible) to the speaker of the group call. Moreover, as participant statuses change over time, the summary presented to the speaker is updated dynamically. The speaker is thereby given access to a summary outlining the experience of each group call participant in real-time. This allows the speaker to identify group call participants that were unable to experience at least some of the content (e.g., audio signal(s)) being shared over the group call despite being in attendance, and dynamically tailor a remainder of the group call accordingly. The speaker can thereby continue the group call with greater confidence by making timely adjustments and avoiding misunderstandings among participants (e.g., listeners). This desirably improves the efficiency and completeness of the group call.

In other approaches, the statuses of the participants may be combined to form a simplified representation of performance. For example, in some implementations the number of group call participants that have received a predetermined amount of a source audio signal (or are experiencing a "positive status") may be divided by the total number of group call participants in real-time, thereby producing a quotient that dynamically represents the percentage of group call participants that are currently experiencing desirable audio quality on the group call. Similarly, the number of group call participants that have received less than a predetermined amount of a source audio signal (or are experiencing a "negative status") may be divided by the total number of group call participants in real-time, thereby producing a quotient that dynamically represents the percentage of group call participants that are currently experiencing undesirable audio quality on the group call.

In response to determining a sufficient amount of the source audio signal was received by a participant of the group call, method 300 advances from operation 318 to operation 320. In other words, method 300 advances from operation 318 to operation 320 in response to determining that the number of differences between the source audio signal originating from the speaker, and the unique version of the source audio signal received by a participant of the group call is in a predetermined range. There, operation 320 includes outputting a positive status for the given participant. As shown, the positive status is sent to the speaker at node 302. Thus, the positive status effectively indicates to the speaker that the given participant experienced desirable (e.g., satisfactory, sufficient, accurate, etc.) audio quality as a result of receiving a sufficient amount of the original source audio signal. In other words, the positive status effectively indicates to the speaker that a number of differences between the original source audio signal and the resulting audio signal as it was received by a group call participant is in a predetermined range.

However, in response to determining an insufficient amount of the source audio signal was received by a participant of the group call, method 300 advances to operation 322. There, operation 322 includes outputting a negative status for the given participant, the negative status being output to the speaker at node 302. Here, the negative status effectively indicates to the speaker that the given participant experienced undesirable (e.g., unsatisfactory, insufficient, ambiguous, etc.) audio quality as a result of receiving an insufficient amount of the original source audio signal. In other words, the negative status effectively indicates to the speaker that a number of differences between the original source audio signal and the resulting audio signal as it was received by a group call participant is outside a predetermined range.

Again, operation 318 is able to determine whether a group call participant received an audio signal that is sufficiently similar to an original source audio signal. Operations 320 and 322 are thereby able to output statuses of the group call participants to the speaker in real-time, the statuses being correlated with the amount of the source audio signal that was received by the respective participants. Although not shown, resulting audio signals received from group call participants may be processed before and/or after comparing it to the source audio signal. For example, Acoustic Echo Cancellation may be performed on a resulting audio signal received from a group call participant in an attempt to remove any echoes, reverberation, or any other unwanted sounds that may have been added to the base signal during processing and/or transit. This may cause the resulting audio signal to become more similar to the source audio signal and avoid unnecessarily resending portions of the source audio signal to the group call participants that experienced a desirable audio quality.

With continued reference to FIG. 3A, method 300 proceeds from operation 322 to operation 324 in response to determining the amount of the source audio signal received by a given participant is outside a predetermined range. In other words, method 300 advances to operation 324 in response to determining one of the participants experienced undesirable audio quality. There, operation 324 includes identifying portions of the source audio signal that are absent from the copy of the resulting audio signal received by the given participant experiencing undesirable audio quality.

Portions of the source audio signal that were not received by a group call participant may be identified using any of the approaches described above with respect to performing operation 316. Thus, in some approaches a sentence segmentation dataset correlated with the source audio signal may be compared against a sentence segmentation dataset that is correlated with the resulting audio signal received by a group call participant. As noted above, it is beneficial to separate statements made in the audio signals into different sentences to gain an accurate understanding of the different ideas that are being conveyed by the speaker to the remaining participants on the group call.

In response to identifying the portions of the source audio signal that were not received by a given participant on the group call, operation 326 further includes resending the identified portions of the source audio signal to the given group call participant. In some approaches, portions of the source audio signal that are adjacent to the identified missing portions may also be resent to the participant. For example, a sentence in the source audio signal identified as not having been received by a group call participant may be resent, in addition to a sentence directly preceding the identified sentence and a sentence directly following the identified sentence. This may provide redundancy that ensures the full source audio signal is received by the participant.

The portions that are resent to participants on a group call may be gathered from a copy of the original source audio signal stored in memory (e.g., see operation 310). However, in some approaches a request may be sent to the speaker at node 302 for a copy of the identified portions of the source audio signal. In still other approaches, a request may be sent to other participants on the group call that successfully received the identified portions of the source audio signal. It should also be noted that while operation 326 is shown as resending the identified portions of the source audio signal to the group call participant at node 303, this is in no way intended to be limiting.

In addition to resending the identified portions of the source audio signal, operation 326 includes sending one or more instructions to the group call participant. In preferred approaches, the one or more instructions cause the identified portions of the source audio signal that are resent to node 303, to replace the corresponding portions of the resulting audio signal that was previously received by the given participant. See operation 328. In other words, the portions of the source audio signal that are resent are preferably used to supplement the information available to the group call participant at node 303. In other approaches, the portions of the source audio signal that are resent are appended to the resulting audio signal that was previously received by the given participant. In still further approaches, the identified portions of the source audio signal that are resent to node 303, are used to replace the corresponding portions of the resulting audio signal that was received at node 301 from the given participant at node 303. This allows the central node 301 to maintain an accurate representation of the information that has been received by each of the group call participants.

In response to updating the resulting audio signal available to the group call participant at node 303, method 300 advances from operation 328 to operation 330. There, operation 330 includes sending one or more instructions to node 303 that result in the group call participant at node 303 being able to selectively replay the portions of the source audio signal that were resent from node 301. For instance, in some approaches operation 330 includes causing at least one logical button to appear in a user interface displayed on a screen that is accessible to the given participant. See operation 332. The logical buttons may be configured such that activating each of the logical buttons initiates replaying a respective portion of the source audio signal resent in operation 326. For example, each logical button may correspond to a different sentence in the portions of the source audio signal that are resent. This allows the group call participant to replay each sentence that was missed.

The participant may also be able to replay each resent portion of the source audio signal a desired number of times by continuing to activate the logical button. However, in some approaches each portion of the source audio signal that is resent to a group call participant may be repeated a certain number of times, available for a predetermined amount of time, accessible until a predetermined condition is met (e.g., a new speaker is identified in the group call), etc. In preferred approaches, activating the logical button initiates a corresponding portion of the source audio signal being replayed over a speaker accessible to (e.g., able to be heard by) a user. In some implementations, portions of the source audio signal may be repeated using a first speaker over a first audio channel, while audio corresponding to the live group call is played using a second speaker over a second audio channel (e.g., see speakers 234, 236 of FIG. 2). This allows a participant to actively follow the group call, while also relistening to portions of the group call that was missed.

Depending on the approach, the logical button may be activated differently. For instance, in some approaches the logical button may be activated in response to a user moving a cursor such that it overlaps at least a portion of the logical button, in combination with activating a physical selector. According to an example, a user may move a physical computer mouse until a cursor visible on the user interface overlaps at least a portion of the logical button, before compressing a physical button on the mouse (i.e., "clicking" the mouse), thereby activating the logical button. In another example, a user holding a stylus may physically touch a functional tip of the stylus to a region of a touchscreen that corresponds to the logical button. However, use of a "logical button" as used herein is in no way intended to be limiting. Rather than activating a logical button, equivalent steps may be taken to selectively replay portions of an audio signal. For instance, a command which identifies a specific portion of an audio signal may be entered in a command prompt, ultimately causing the specific portion of the audio signal to be replayed.

It follows that method 300 is able to maintain a desirable signal quality for each participant of a group call. In other words, method 300 involves comparing the information received by each participant of a group call with the information originally sent to the participants. This identifies situations where information sent to participants of a group call is lost in transit, providing an opportunity for the lost information to be automatically resupplied. This desirably ensures that each of the participants on a group call are able to follow along with the content presented during the group call. Moreover, this is accomplished without negatively affecting the experience of the remaining participants on the group call.

According to an in-use example, which is in no way intended to limit the invention, a central node (e.g., see 202 of FIG. 2 and/or node 301 of FIG. 3A) configured to monitor communication between members of a group call may include an ON-OFF valve to control when communication is monitored. The central node may further include a response valve, a loading and analysis module that initially receives and evaluates the audio signals, as well as an audio pairing module and voice alignment module which compare an original audio signal with copies of the signal as received at remote locations. These valves and modules may further operate in conjunction with an application that helps facilitate group calls between multiple participants. Moreover, the application may be running on an operating system that is implemented by hardware, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method (CIM), comprising:
   receiving a source audio signal from a speaker on a group call between the speaker and participants;
   receiving copies of resulting audio signals from the participants, the copies of the resulting audio signals including unique versions of the source audio signal as received by the respective participants;
   determining an amount of the source audio signal received by the respective participants by comparing the source audio signal with the respective copies of the resulting audio signals; and
   outputting statuses to the speaker, the statuses being correlated with the amount of the source audio signal received by the respective participants by:
   dynamically combining the statuses, correlated with the amount of the source audio signal received by the respective participants, into a summary,
   causing the summary to be displayed in real-time on a user interface corresponding to the speaker, and
   dynamically updating the summary as the statuses change over time.

2. The CIM of claim 1, comprising:
   in response to determining the amount of the source audio signal received by a given participant is outside a predetermined range, identifying portions of the source audio signal that are absent from the copy of the resulting audio signal received by the given participant;
   resending the identified portions of the source audio signal to the given participant; and
   causing the identified portions of the source audio signal to replace corresponding portions of the resulting audio signal received by the given participant.

3. The CIM of claim 2, comprising:
   causing a logical button to be displayed on a user interface corresponding to the given participant, the logical button being configured to initiate replaying the identified portions of the source audio signal in response to the logical button being activated.

4. The CIM of claim 1, wherein the determining of the amount of the source audio signal received by a given participant includes:
   producing first sentence segments by performing sentence segmentation on the source audio signal;
   partitioning the first sentence segments based at least in part on respective types of statements made in the first sentence segments and/or respective subjects of the statements in the first sentence segments;
   using the partitioned first sentence segments to generate a first sentence segmentation dataset for the source audio signal;
   producing second sentence segments by performing sentence segmentation on the respective copy of the resulting audio signal received by the given participant, wherein the second sentence segments are not partitioned;
   using the non-partitioned second sentence segments to generate a second sentence segmentation dataset for the respective copy of the resulting audio signal received by the given participant; and comparing the first and second sentence segmentation datasets.

5. The CIM of claim 1, wherein the determining of the amount of the source audio signal received by the respective participants includes, for each of the participants:

determining whether one of the copies of the resulting audio signals was received from a given participant;

in response to determining one of the copies of the resulting audio signals was received from the given participant, comparing the source audio signal with the determined one of the copies of the resulting audio signals; and determining a number of differences between the source audio signal and the determined one of the copies of the resulting audio signals.

6. The CIM of claim 5, wherein the determining of the amount of the source audio signal received by the respective participants further includes, for each of the participants:

in response to determining one of the copies of the resulting audio signals was not received for the given participant, outputting a negative status for the given participant to the speaker.

7. The CIM of claim 5, wherein the determining of the amount of the source audio signal received by the respective participants further includes, for each of the participants:

in response to determining the number of differences between the source audio signal and the determined one of the copies of the resulting audio signals is not in a predetermined range, outputting a negative status for the given participant to the speaker.

8. The CIM of claim 7, wherein the determining of the amount of the source audio signal received by the respective participants further includes, for each of the participants:

in response to determining the number of differences between the source audio signal and the determined one of the copies of the resulting audio signals is in the predetermined range, outputting a positive status for the given participant to the speaker.

9. A computer program product (CPP), comprising:

a set of one or more computer readable storage media; and program instructions, collectively stored in the set of one or more storage media, for causing a processor set to perform computer operations including:

receive a source audio signal from a speaker on a group call between the speaker and participants;

receive copies of resulting audio signals from the participants, the copies of the resulting audio signals including unique versions of the source audio signal as received by the respective participants;

determine an amount of the source audio signal received by the respective participants by comparing the source audio signal with the respective copies of the resulting audio signals; and output statuses to the speaker, the statuses being correlated with the amount of the source audio signal received by the respective participants by:

dynamically combining the statuses, correlated with the amount of the source audio signal received by the respective participants, into a summary, causing the summary to be displayed in real-time on a user interface corresponding to the speaker, and dynamically updating the summary as the statuses change over time.

10. The CPP of claim 9, comprising program instructions, collectively stored in the set of one or more computer readable storage media, for causing the processor set to perform computer operations further including:

in response to determining the amount of the source audio signal received by a given participant is outside a predetermined range, identify portions of the source audio signal that are absent from the copy of the resulting audio signal received by the given participant;

resend the identified portions of the source audio signal to the given participant; and cause the identified portions of the source audio signal to replace the corresponding portions of the resulting audio signal received by the given participant.

11. The CPP of claim 10, comprising program instructions, collectively stored in the set of one or more computer readable storage media, for causing the processor set to perform computer operations further including:

cause a logical button to be displayed on a user interface corresponding to the given participant, the logical button being configured to initiate replaying the identified portions of the source audio signal in response to the logical button being activated.

12. The CPP of claim 9, wherein the determining of the amount of the source audio signal received by a given participant includes:

performing sentence segmentation on the source audio signal;

generating a first sentence segmentation dataset for the source audio signal;

performing sentence segmentation on the respective copy of the resulting audio signal received by the given participant;

generating a second sentence segmentation dataset for the respective copy of the resulting audio signal received by the given participant; and comparing the first and second datasets.

13. The CPP of claim 9, wherein the determining of the amount of the source audio signal received by the respective participants includes, for each of the participants:

determining whether one of the copies of the resulting audio signals was received from a given participant;

in response to determining one of the copies of the resulting audio signals was received from the given participant, comparing the source audio signal with the determined one of the copies of the resulting audio signals; and determining a number of differences between the source audio signal and the determined one of the copies of the resulting audio signals.

14. The CPP of claim 13, wherein the determining of the amount of the source audio signal received by the respective participants further includes, for each of the participants:

in response to determining one of the copies of the resulting audio signals was not received for the given participant, outputting a negative status for the given participant to the speaker.

15. The CPP of claim 13, wherein the determining of the amount of the source audio signal received by the respective participants further includes, for each of the participants:

in response to determining the number of differences between the source audio signal and the determined one of the copies of the resulting audio signals is not in a predetermined range, outputting a negative status for the given participant to the speaker.

16. The CPP of claim 15, wherein the determining of the amount of the source audio signal received by the respective participants further includes, for each of the participants:

in response to determining the number of differences between the source audio signal and the determined one of the copies of the resulting audio signals is in the predetermined range, outputting a positive status for the given participant to the speaker.

17. A computer system (CS), comprising:

a processor set;

a set of one or more computer readable storage media;

program instructions, collectively stored in the set of one or more computer readable storage media, for causing the processor set to perform computer operations including:

receive a source audio signal from a speaker on a group call between the speaker and participants;

receive copies of resulting audio signals from the participants, the copies of the resulting audio signals including unique versions of the source audio signal as received by the respective participants;

determine an amount of the source audio signal received by the respective participants by comparing the source audio signal with the respective copies of the resulting audio signals;

output statuses to the speaker, the statuses being correlated with the amount of the source audio signal received by the respective participants; and in response to determining the amount of the source audio signal received by a given participant is outside a predetermined range:

identify portions of the source audio signal that are absent from the copy of the resulting audio signal received by the given participant;

resend the identified portions of the source audio signal to the given participant;

cause the identified portions of the source audio signal to replace the corresponding portions of the resulting audio signal received by the given participant; and cause a logical button to be displayed on a user interface corresponding to the given participant, the logical button being configured to initiate replaying the identified portions of the source audio signal in response to the logical button being activated.

18. The CS of claim 17, comprising program instructions, collectively stored in the set of one or more computer readable storage media, for causing the processor set to perform computer operations further including:

causing a logical button to be displayed on a user interface corresponding to the given participant, the logical button being configured to initiate replaying the identified portions of the source audio signal in response to the logical button being activated, wherein outputting statuses to the speaker includes:

dynamically combining the statuses, correlated with the amount of the source audio signal received by the respective participants, into a summary, causing the summary to be displayed in real-time on a user interface corresponding to the speaker, and dynamically updating the summary as the statuses change over time, wherein the determining of the amount of the source audio signal received by a given participant includes:

producing first sentence segments by performing sentence segmentation on the source audio signal;

partitioning the first sentence segments based at least in part on respective types of statements made in the first sentence segments and/or respective subjects of the statements in the first sentence segments;

using the partitioned first sentence segments to generate a first sentence segmentation dataset for the source audio signal;

producing second sentence segments by performing sentence segmentation on the respective copy of the resulting audio signal received by the given participant, wherein the second sentence segments are not partitioned;

using the non-partitioned second sentence segments to generate a second sentence segmentation dataset for the respective copy of the resulting audio signal received by the given participant; and comparing the first and second sentence segmentation datasets.

* * * * *